United States Patent
Otte et al.

(10) Patent No.: US 10,379,428 B2
(45) Date of Patent: Aug. 13, 2019

(54) MULTI-CONFIGURATION SIMULATOR SCREEN SYSTEM AND METHOD(S) OF USE

(71) Applicant: Ti Training Corp., Golden, CO (US)

(72) Inventors: Gregory Otte, Golden, CO (US); Todd R. Brown, Golden, CO (US); Joseph J. Mason, Golden, CO (US)

( * ) Notice: Subject to any disclaimer, the term of this patent is extended or adjusted under 35 U.S.C. 154(b) by 121 days.

(21) Appl. No.: 15/782,600

(22) Filed: Oct. 12, 2017

(65) Prior Publication Data
US 2018/0107104 A1 Apr. 19, 2018

Related U.S. Application Data

(60) Provisional application No. 62/407,805, filed on Oct. 13, 2016.

(51) Int. Cl.
| | |
|---|---|
| G03B 21/10 | (2006.01) |
| G03B 21/58 | (2014.01) |
| G03B 21/56 | (2006.01) |
| F41G 3/26 | (2006.01) |
| F41A 33/02 | (2006.01) |
| E04B 1/35 | (2006.01) |
| F16M 11/04 | (2006.01) |
| G03B 37/04 | (2006.01) |

(52) U.S. Cl.
CPC ............ G03B 21/10 (2013.01); F41A 33/02 (2013.01); F41G 3/2633 (2013.01); F41G 3/2655 (2013.01); G03B 21/562 (2013.01); G03B 21/58 (2013.01); E04B 1/35 (2013.01); F16M 11/04 (2013.01); G03B 37/04 (2013.01)

(58) Field of Classification Search
CPC .......... G03B 21/10; G03B 21/58; G09B 9/32
USPC ........................................... 359/449
See application file for complete search history.

(56) References Cited

U.S. PATENT DOCUMENTS

| | | | | |
|---|---|---|---|---|
| 5,926,153 | A * | 7/1999 | Ohishi ................... | G09B 9/32 345/1.1 |
| 6,735,015 | B1 * | 5/2004 | Blackham .......... | G02B 27/0101 348/121 |
| 9,140,963 | B2 | 9/2015 | Corey et al. | |
| 9,632,399 | B2 | 4/2017 | Corey et al. | |
| 2005/0270497 | A1 * | 12/2005 | Kepley, Jr. ............. | G03B 23/08 353/79 |
| 2009/0201430 | A1 * | 8/2009 | Streid ..................... | G09B 9/08 348/744 |
| 2010/0290010 | A1 * | 11/2010 | Hirata .................... | G02B 13/18 353/37 |
| 2014/0251841 | A1 * | 9/2014 | Corey .................... | G03B 21/10 206/223 |

(Continued)

*Primary Examiner* — Christopher E Mahoney
(74) *Attorney, Agent, or Firm* — Leyendecker & Lemire, LLC

(57) ABSTRACT

A multi-configuration simulator screen system and methods of use are described. Embodiments of the present invention include a multi-configuration screen assembly and a simulator system for running training scenarios on the multi-configuration screen assembly. The multi-configuration screen assembly can include a pair of screens rotatably coupled to a middle screen. The pair of screens can be rotated relative to the middle screen allowing for the simulator system to be implemented with a plurality of differently configured screens.

20 Claims, 12 Drawing Sheets

(56) References Cited

U.S. PATENT DOCUMENTS

2016/0080710 A1\* 3/2016 Hattingh .............. H04N 9/3185
            348/52
2016/0293040 A1\* 10/2016 Ireland ................... G09B 9/301

\* cited by examiner

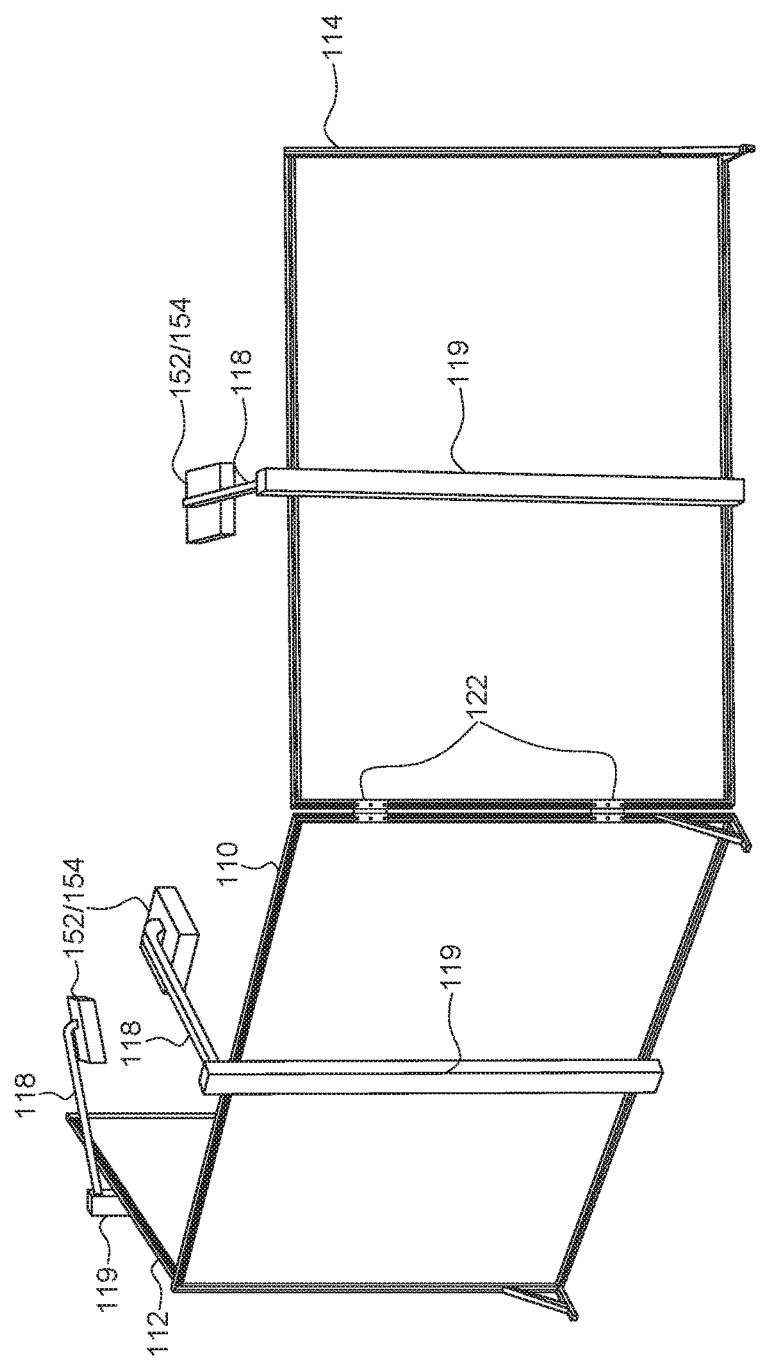

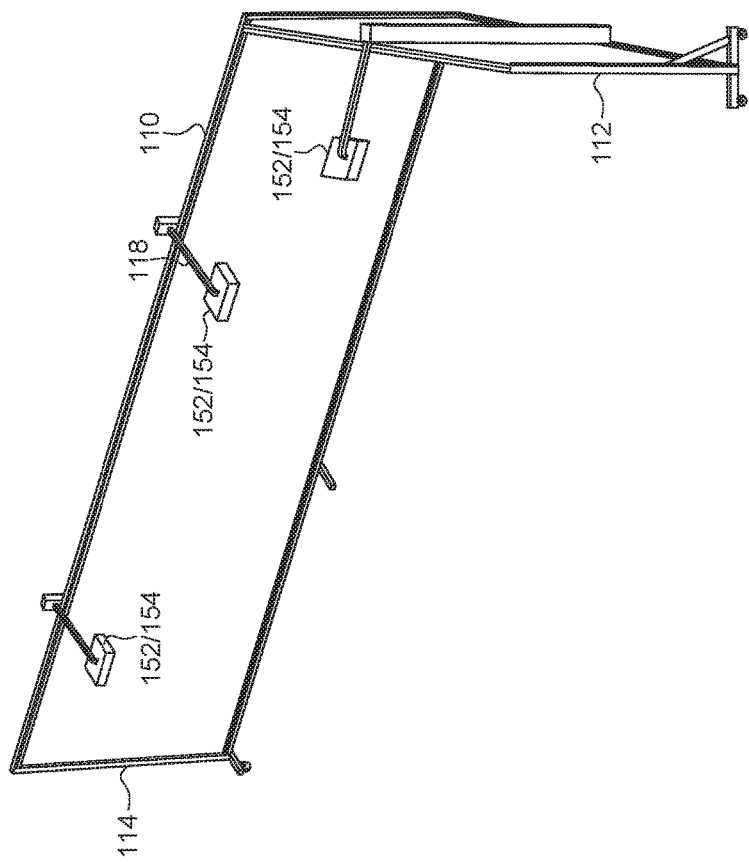

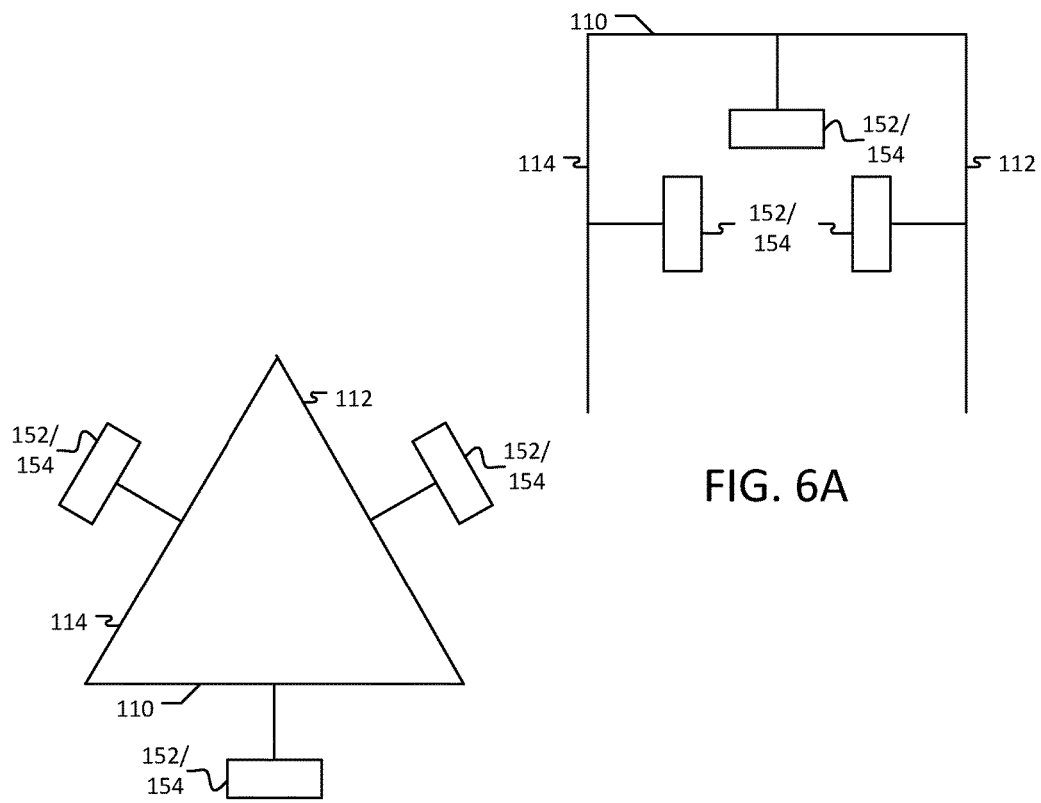
FIG. 6A
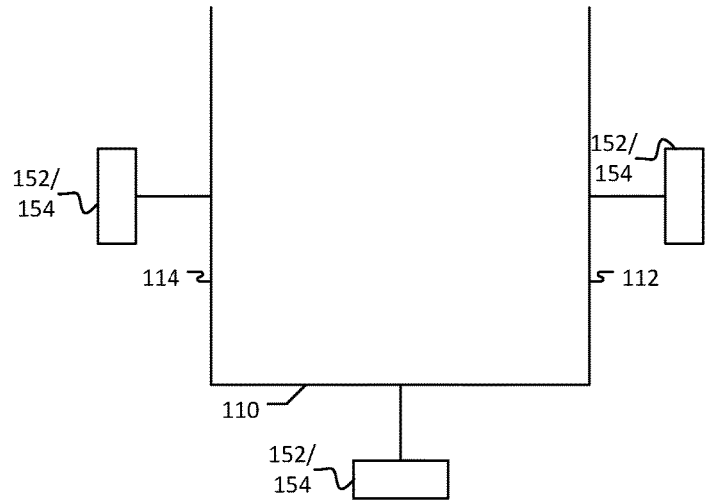
FIG. 6B
FIG. 6C

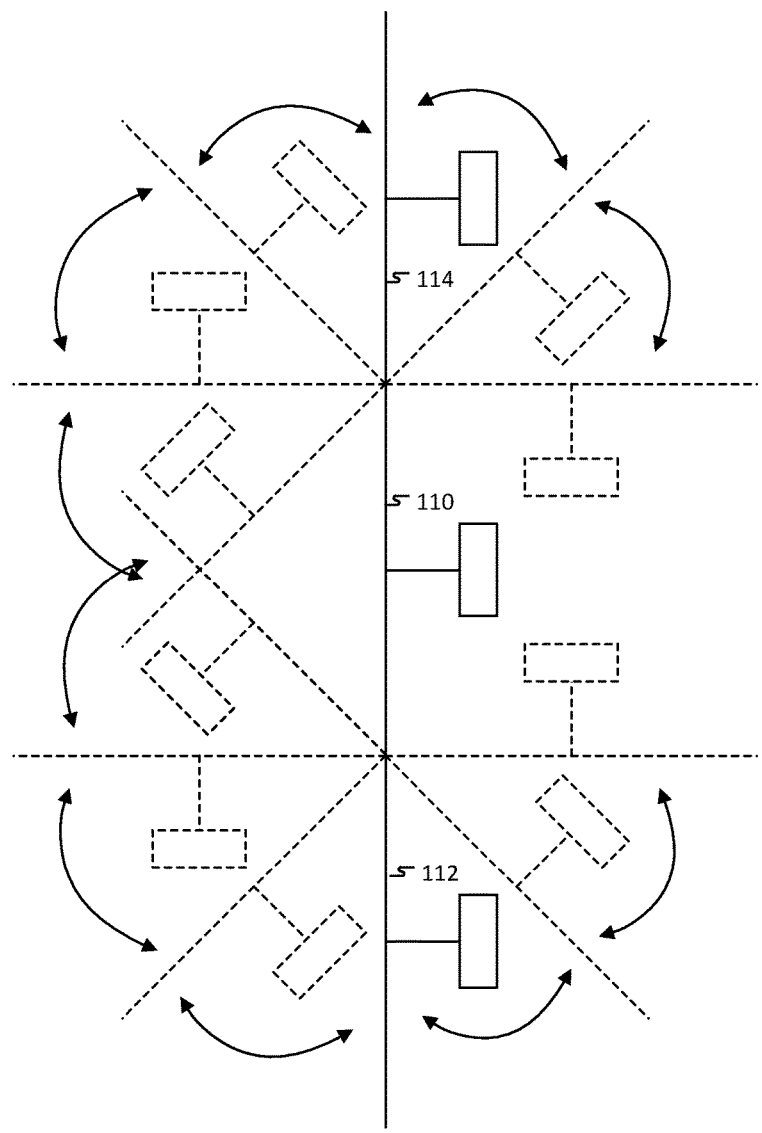

MULTI-CONFIGURATION SIMULATOR SCREEN SYSTEM AND METHOD(S) OF USE

CROSS-REFERENCE TO RELATED APPLICATION

This application claims the benefit of U.S. Provisional Application No. 62/407,805, filed Oct. 13, 2016.

BACKGROUND

Simulator systems including one or more display screens and one or more projectors are currently known. Typically, a projector will be mounted to the ceiling or a pole extending down from the ceiling when used in a simulator system to be out of the way participants. With the projector mounted to the ceiling, the projector is limited in where the projector can project onto. For instance, when multiple screens are used, each projector must be strategically placed to provide a proper display on each of the intended screens. If a screen needs to be moved, the associated projector will also need to be repositioned, or possibly refocused, to provide a proper display on the screen that was moved.

Therefore, a system is needed that allows a projector to be moved in conjunction with a paired screen when the screen is moved.

BRIEF DESCRIPTION OF THE DRAWINGS

FIG. 4 is back perspective view of a multi-configuration screen assembly according to one embodiment of the present invention.

FIG. 5 is a front perspective view of a multi-configuration screen assembly according to one embodiment of the present invention.

FIGS. 6A-6E illustrate various configurations of a multi-configuration screen assembly according to embodiments of the present invention.

FIG. 7 illustrates how moveable screens of the multi-configuration screen assembly can rotate between a plurality of different configurations according to one embodiment of the present invention.

DETAILED DESCRIPTION

Figure 1:
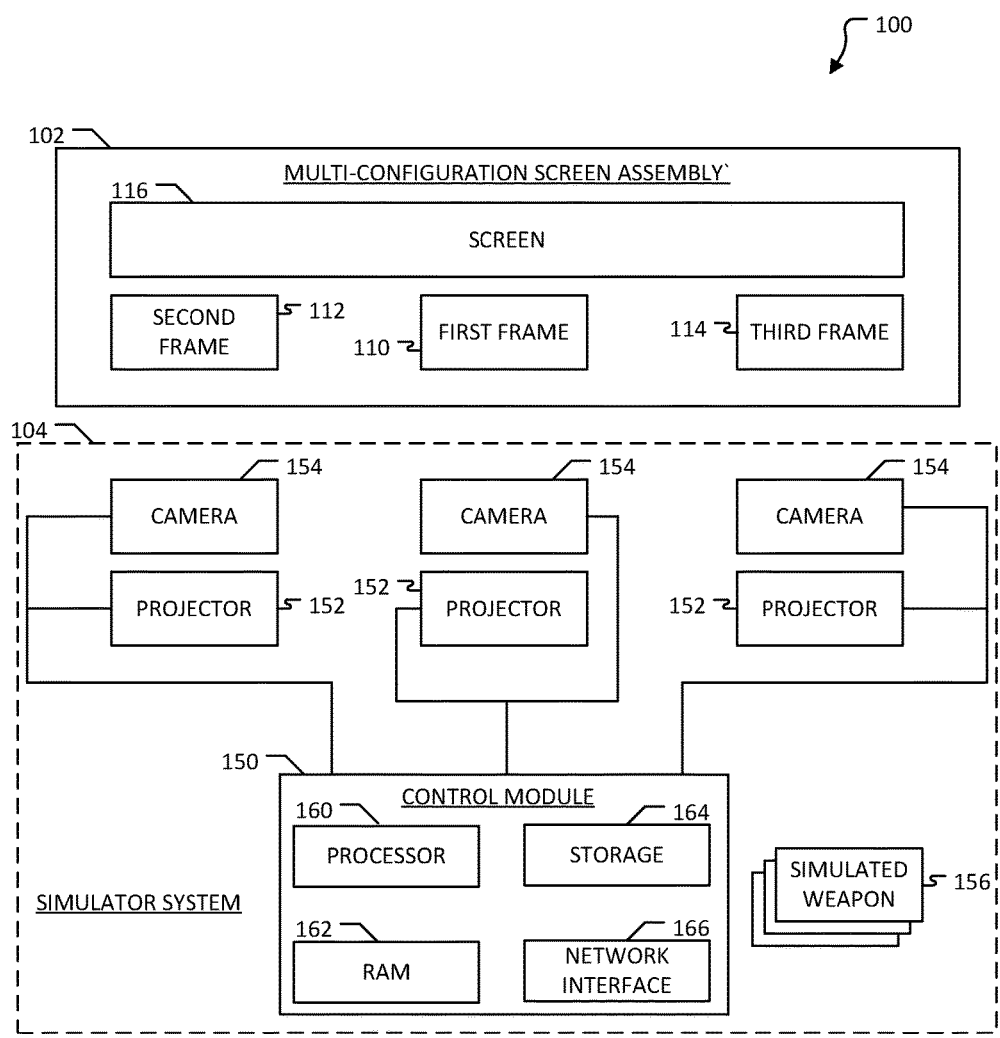
FIG. 1 is a block diagram of a multi-configuration simulator screen system according to one embodiment of the present invention.

Embodiments of a present invention include a multi-configuration simulator screen system and methods of use. The multi-configuration simulator screen system can include, but is not limited to, a multi-configuration screen assembly and a simulator system. Typically, the simulator system can be implemented to run a simulated scenario and the multi-configuration screen assembly can be implemented to display the simulated scenario.

In one embodiment, the multi-configuration screen assembly can include, but is not limited to, a first frame, a second frame, a third frame, at least one screen, and a boom adapted to couple proximate a top of each of the frames. The simulator system can include, but is not limited to, a control module, one or more simulated weapons, a plurality of projectors, and a plurality of cameras. The plurality of cameras can be implemented to detect pulses of light generated by the simulated weapons. The plurality of projectors can be implemented to project one or more training scenarios onto the multi-configuration screen assembly.

Typically, the first frame can be a static frame that is located between the second frame and the third frame. The second frame and the third frame can each be rotatably coupled to the first frame. The at least one screen can be attached to each of the frames. In some embodiments, each of the frames can have a screen. In other instances, a single screen may be attached to each of the frames, but allow for the rotatable frames to move.

In a typical implementation, a projector and a camera can be mounted to a distal end of a boom coupled to each of the frames. For instance, the boom can be located proximate an upper portion of each of the frames and extend out from the frames where a mount can be located. The mount can be implemented to couple the projector and the camera to the boom. As can be appreciated, each of the frames can include a projector for projecting a video onto a screen attached to said frame. By having the projector attached to the rotatable frames, and the static frame, the projectors may stay in-focus on the frames even when the frames are rotated to a new configuration. Further, the multi-configuration screen assembly can be constantly reconfigured without having to re-focus the projectors. As can be appreciated, simulations can take place where the multi-configuration screen assembly can be reconfigured in conjunction with the simulated training scenario. In other instances, the multi-configuration screen assembly can be configured to provide three independent screens allowing multiple users to interact with individualized training scenarios.

Generally, the first frame can have a hinged connection to the second frame on one side and a hinged connection to the third frame on the other side. As can be appreciated, the second frame and the third frame can move (or rotate) relative to the static frame providing a plurality of different configurations.

Embodiments of another invention include a modular virtual shoot house system and methods of use. The modular virtual shoot house system can include, but is not limited to, a modular shoot house, a plurality of projectors, a plurality of cameras, and a simulator system. Typically, a projector and a camera can be paired together and coupled to a bracket for securing to the modular shoot house. In a typical implementation, each of the rooms of the shoot house can include one or more projector/camera pairings to display on a wall of the room where the projector is pointed. For example, a first room may have three projector/cameras displaying on three walls of the first room and a second room may have one projector/camera displaying on one wall of the second room.

Of significant note, a user's experience with the virtual shoot house can be altered without having to change a layout of the shoot house structure. Currently, to change a user's experience or training scenario in a shoot house, the layout of the shoot house must be altered. For instance, to provide a different training scenario, the shoot house would need to be disassembled and reassembled into a new configuration to work on a new training objective. With the virtual shoot house, the projectors and cameras can be moved relatively easily and quickly to alter the training objectives without having to physically move walls to make rooms appear different while training. As can be appreciated, a plethora of training exercises can be executed without having to change a layout of the shoot house. At worst, the projectors and cameras would need to be repositioned around the shoot house to get a new experience.

The following applications are incorporated by reference in their entirety: U.S. application Ser. No. 13/964,683, filed Aug. 12, 2013, titled "DISRUPTOR DEVICE SIMULATION SYSTEM"; U.S. application Ser. No. 14/597,464, filed Jan. 15, 2015, titled "DISRUPTOR DEVICE SIMULATION SYSTEM"; and U.S. application Ser. No. 14/923,185, filed Oct. 26, 2015, titled "USE OF FORCE TRAINING SYSTEM IMPLEMENTING EYE MOVEMENT TRACKING".

One or more components of the present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

An Embodiment of a Multi-Configuration Simulator Screen System

Referring to FIG. 1, a block diagram of a first embodiment 100 of a multi-configuration simulator screen system is illustrated. The multi-configuration simulator screen system 100 can be implemented to provide a plurality of simulator training configurations from individual use life size screens to a single large screen.

As shown in FIG. 1, the multi-configuration simulator screen system 100 can include, but is not limited to, a multi-configuration screen assembly 102 and a simulator system 104. The multi-configuration screen assembly 102 can be implemented to display one or more training scenarios being run by the simulator system 104.

The multi-configuration screen assembly 102 can include, but is not limited to, a first frame 110, a second frame 112, a third frame 114, and at least one screen 116. As will be discussed further hereinafter, the first frame 110 can be implemented as a static frame, the second frame 112 can be implemented as a first rotatable frame, and the third frame 114 can be implemented as a second rotatable frame. Typically, each of the frames 110, 112, 114 can be coupled together to form one configurable frame. The screen 116 can be configured to couple to the frames 110, 112, 114, and provide a surface for displaying one or more scenarios run by the simulator system 104. For instance, the frames 110, 112, 114 may collectively display a single training scenario. In another instance, the frames 110, 112, 114 may individually each display a different training scenario.

The simulator system 104 can include, but is not limited to, a control module 150, a plurality of projectors 152, a plurality of cameras 154, and one or more simulated weapons 156. The plurality of projectors 152 can be implemented to project training scenario(s) onto the screen 116 of the multi-configuration screen assembly 102. The plurality of cameras 154 can be implemented to detect pulses of light generated by the simulated weapons 156.

Typically, the control module 104 can be any type of computing device including, but not limited to, a personal computer, a server, a game console, a smartphone, a tablet, a netbook computer, or other computing devices. In one embodiment, the control module 150 can be a distributed system wherein computing functions are distributed over several computers connected to a network. The control module 150 can typically have a hardware platform and software components.

As shown in FIG. 1, the control module 150 can generally include a processor 160, random access memory 162, a network interface 164, and a nonvolatile storage (or memory) 166. The processor 160 can be a single microprocessor, multi-core processor, or a group of processors. The random access memory 162 can store executable code as well as data that may be immediately accessible to the processor 160, while the nonvolatile storage 164 can store executable code and data in a persistent state. The network interface 166 can include hardwired and wireless interfaces through which the control module 150 can communicate with other devices and/or networks. In some embodiments, more than one control module can be implemented. For instance, a control module can be operatively coupled to each of the cameras and the projectors.

The control module 150 can be adapted to store and play training scenarios. Typically, the control module 150 can be configured to run a program or application which can decipher signals generated by the simulated weapons 156 and detected by one of the cameras 154. For instance, the cameras 154 can be configured to detect pulses of light from lasers integrated with or combined with the simulated weapons 156. In some instances, the lasers can be retroactively fitted to real weapons to simulate firing a live weapon.

The projectors 152 and the cameras 154 can be operatively connected to the control module 150. For instance, the control module 150 can run a training scenario which the projectors 152 can display onto the screen 116. In one embodiment, the control module 150 can sync a training scenario to be projected by each of the projectors 152. The cameras 154 can be implemented to detect pulses of light fired from one of the simulated weapons 156. Of note, the control module 150 can be configured to determine if a detected pulse of light from each of the cameras 154 hit a target. For instance, the control module 150 can determine if a pulse of light hit an intended target on the multi-configuration screen assembly 102 based on receiving a signal from one of the cameras 154. Typically, the control module 150 can associate a particular projector and camera with a frame. As can be appreciated, where the multi-configuration screen assembly 102 is set up for individual screens, the control module 150 can be configured to differentiate between pulses of light detected by the cameras on each screen.

In embodiments with more than one control module, each of the control modules can be configured to display synchronized training scenarios on the multi-configuration screen assembly 102. Of note, and as discussed later, when the multi-configuration screen assembly 102 is set up to be three independent screens, multiple control modules can be implemented to run independent scenarios on each of the screens. Alternatively, a single control module can be configured to run independent training scenarios on each of the screens.

Figure 2:
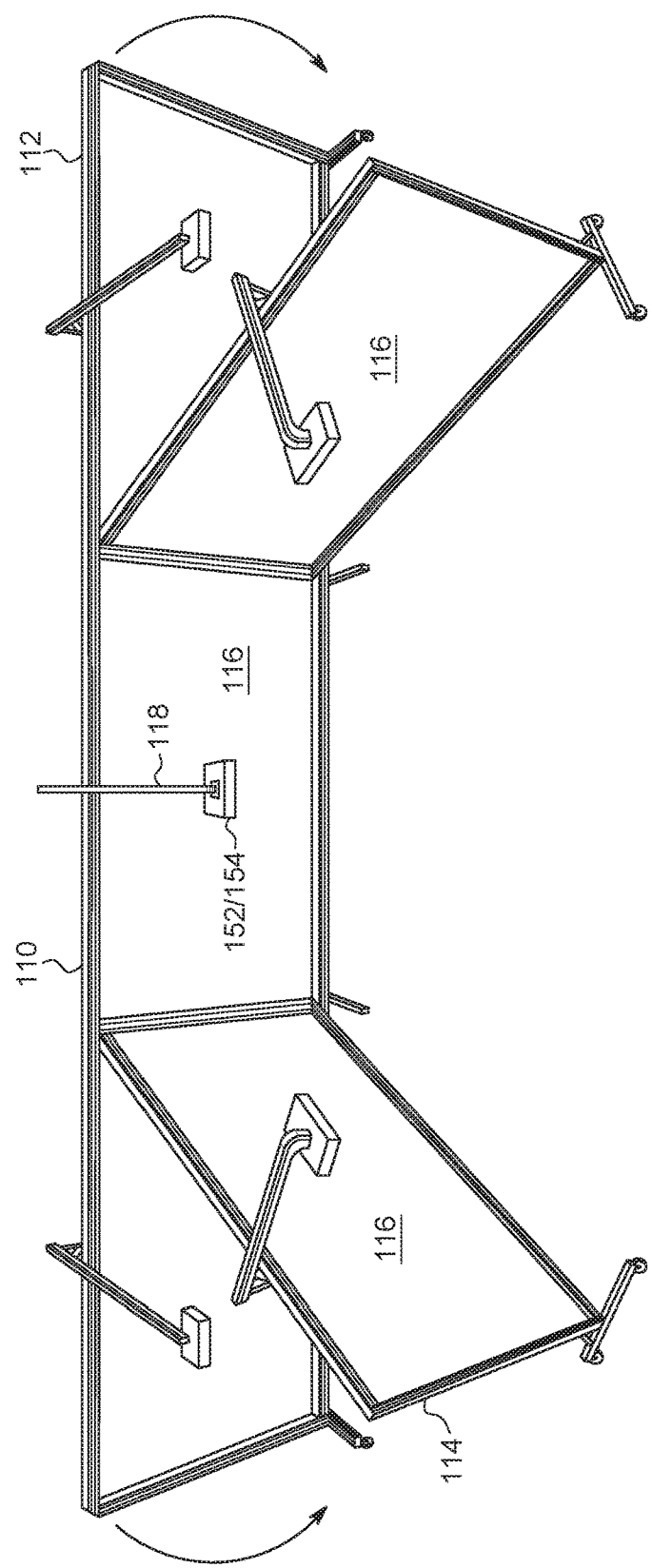
FIG. 2 is a top perspective view of a multi-configuration screen assembly according to one embodiment of the present invention.

Referring to FIG. 2, a detailed diagram of the multi-configuration screen assembly 102 with the projectors 152 and the cameras 154 is illustrated. Of significant note, and as illustrated in FIG. 2, the first rotatable frame 112 and the second rotatable frame 114 can rotate about 45 degrees from being in-line with the static frame 110 to provide an approximately 180 degree viewing surface for a user located near the multi-configuration screen assembly 102. As will be shown generally in the figures, the first rotatable frame 112 and the second rotatable frame 114 can rotate forwards and backwards to provide a plurality of different configurations for the screens 116 of the multi-configuration screen assembly 102.

As shown, the projectors 152 and the cameras 154 can be located above and away from the frames 110-114 of the multi-configuration screen assembly 102. Typically, a boom 118 can be implemented to extend out from each of the frames 110-114. Each of the booms 118 can include a mount 120 located proximate a distal end of the boom 118. The mount 120 can be implemented to couple the projectors 152 and the cameras 154 to the booms 118. Generally, the boom 118 can be located proximate a top of each of the frames 110-114. The boom 118 can extend out from a top of the frames 110-114 such that a bottom of the projectors 152 can be substantially above the top of the screen 116. In one embodiment, the boom 118 can be configured to be telescoping and move in and out from the screen 116.

As shown generally in the figures, the projectors 152 can be located above and away from the screen 116. In one embodiment, to help ensure proper focus, the boom 118 can be moved in and out to allow a user to focus an image projected by the projector 152 on the screen 116. As can be appreciated, once the projector 152 and/or camera 154 have been focused/calibrated with the screen 116, the projector 152 and/or the camera 154 will not need to be refocused/recalibrated when the multi-configuration screen assembly 102 is moved. Of note, when one of the rotatable frames 112-114 moves, the projector 152 and the camera 154 connected to the moving frame can move with the frame. By coupling the projector 152 and the camera 154 to the frames 110-114, the projectors 152 and the cameras 154 will not need to be refocused/recalibrated each time one of the frames is moved.

Figure 3:
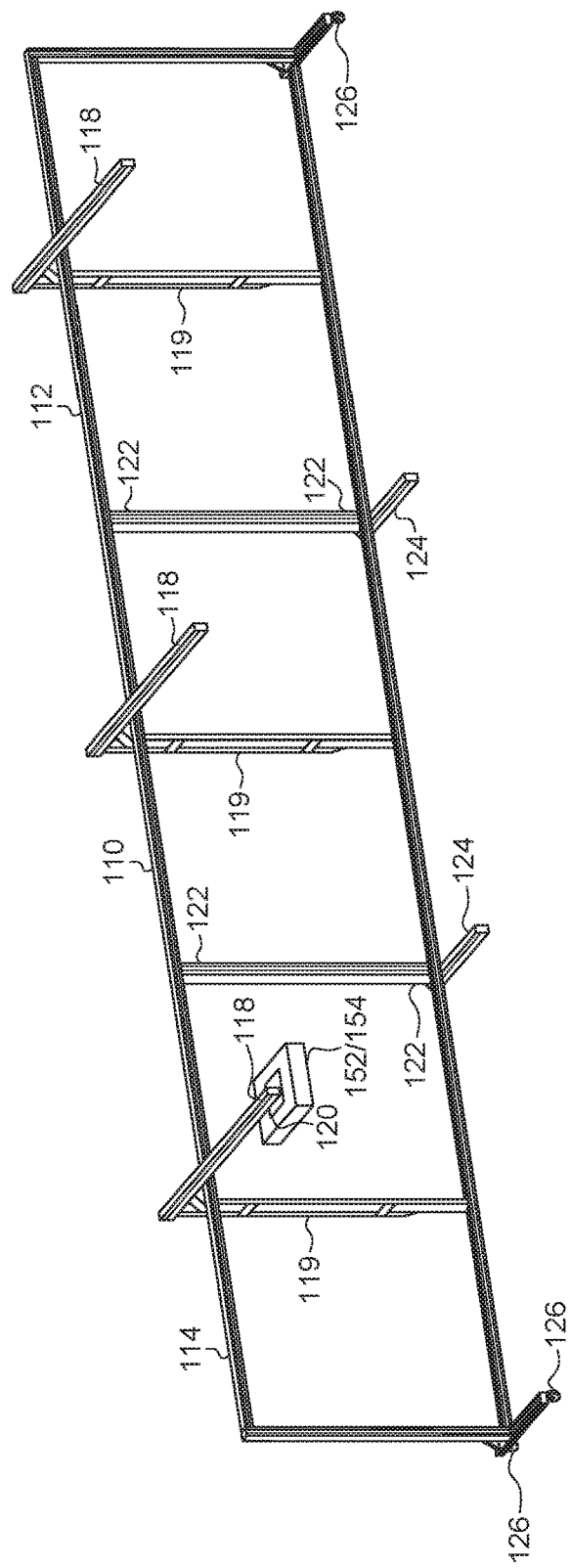
FIG. 3 is a top perspective view of a multi-configuration screen assembly according to one embodiment of the present invention.

Referring to FIG. 3, a detailed diagram of the multi-configuration screen assembly 102 is illustrated without the screen 116.

As shown, the static frame 110 can be located between the first rotatable frame 112 and the second rotatable frame 114. The first rotatable frame 112 and the second rotatable frame 114 can be adapted to rotate relative to the static frame 110. As can be appreciated, the static frame 110 can be stationary relative to the two rotatable frames 112-114. In some instances, the entire multi-configuration screen assembly 102 can be configured to move as one unit when needed.

Typically, a plurality of hinged connections 122 (shown in FIG. 4) can be implemented to couple the first rotatable frame 112 to the static frame 110 and the second rotatable frame 114 to the static frame 110. As can be appreciated, other connection types and means or couplings are contemplated that allow the first rotatable frame 112 and the second rotatable frame 114 to rotate in relation to the static frame 110.

The multi-configuration screen assembly 102 can be configured to provide a variety of different screen layouts depending on a scenario being run by the simulator system 104. In one embodiment, the first rotatable frame 112 and the second rotatable frame 114, located on either side of the static frame 110, can be adapted to rotate approximately 360 degrees from a hinged connection between sides of the frames 110-114. By having the projectors 152 connected to the frames 110-114 via the booms 118, the multi-configuration screen assembly 102 can allow for numerous configurations between the frames 110-114 without having to move and refocus/recalibrate each projector 152 and camera 154 each time the screen assembly 102 is reconfigured.

As shown generally in the figures, the multi-configuration screen assembly 102 can be implemented as one large screen, two combined screens and one independent screen, or three independent screens. With the three independent screens, each screen can be out of the view of a participant on another one of the screens. In such a configuration, the screens can form a substantially "U" shape with the side screens facing out. Alternatively, the configuration illustrated in FIGS. 2-3 can provide an approximately 180 degree view for a participant(s) using the multi-configuration simulator screen system 100. For instance, the three screens can be implemented for one or more participants to use the screens coextensively.

In one embodiment, where a screen is implemented for each of the frames 110-114, adjacent sides of the screens can be coupled together. In such a configuration, each of the screens can be moved in relation to a side of an adjacent screen. In another embodiment, the screens can be independent of one another and be moved independent of the other screens. In yet another embodiment, the screens can be removably coupled to each other.

As shown in FIG. 3, the static frame 110 can include a pair of base supports 124. The base supports 124 can be implemented to keep the static frame 110 upright and support the projector 152 and the camera 154 located at a distal end of the boom 118. In one embodiment, ends or sides of the first rotatable frame 112 and the second rotatable frame 114, located distally from the static frame 110, can include base supports having wheels or casters 126 to facilitate the rotation of the rotatable frames 112-114. However, other means are contemplated for facilitating the movement of the rotatable frames 112-114. In one embodiment, each of the frames 110-114 can be mounted on wheels to facilitate a movement of the entire screen assembly 102.

Each of the frames 110-114 can include the boom 118 extending out from an upper portion of each of the frames. Typically, a support structure 119 can be implemented to provide support to the boom 118. As shown, the support structure 119 can be located approximate a middle of each of the frames 110-114. An end of the boom 118 located proximal to the frames can be coupled to the support structure 119. In one embodiment, the support structure 119 can be adjustable in height, allowing the boom 118 to be moved up and down. As can be appreciated, when one of the frames are moved, the support structure 119 can move with the frame, thus moving the boom, which in turn moves the projector and the camera coupled to the boom with the frame. Of note, the projectors 152 and the cameras 154 are adapted to move with the screen assembly 102 as the screen assembly 102 moves. Therefore, regardless of a configuration of the screen assembly 102, the projectors 152 and the cameras 154 may always be in position without needing to be refocused/recalibrated each time the screen assembly 102 is moved and/or a shape of the screen assembly 102 is reconfigured.

As noted previously, the boom 118 can include the mount 120 for coupling to the projectors 152 and the cameras 154. In one embodiment, the mount 120 can be a rigid plate coupled to the boom 118. In one instance, the projector 152 and the camera 154 can each be rotatably coupled to the mount 120. As can be appreciated, by being rotatably coupled, the projector 152 and the camera 154 can be moved in all directions to properly focus/calibrate with the screen assembly 102.

Referring to FIG. 4, a back view of the multi-configuration screen assembly 102 is illustrated. As shown, the boom 118 can be attached to the support structure 119. As can be appreciated, when one of the rotatable frames 112-114 frames are moved the support structure 119 can move with the frame that moved. With the boom 118 coupled to the support structure 119, the projector 152 and the camera 154 can be moved in unison with the frame.

Referring to FIG. 5, one possible configuration of the multi-configuration screen assembly 102 is illustrated. As shown, the static frame 110 and the second rotatable frame 114 can be set up to form a large flat screen and the first rotatable frame 112 can be oriented substantially at a 45 degree angle from parallel with the other two frames 110, 114. As can be appreciated, if the first rotatable frame 112 were to be moved from being oriented at an angle to being in-line with the other frames 110, 114, the projector 152 and the camera 154 attached to the first rotatable frame 112 can move with the frame 112 ensuring that the screen 116 can be instantaneously used after the frame 112 has been moved or while the frame 112 is moving.

Referring to FIGS. 6A-6E, a block diagram of a plurality of different configurations possible by the multi-configuration screen assembly 102 are illustrated.

As shown in FIG. 6A, the three frames 110-114 can form a substantially "U" shape with the screens 116 facing inward. As shown in FIG. 6B, the rotatable frames 112-114 can be rotated back behind the static frame 110 to form a substantially triangular shape. When the screen assembly 102 is configured as shown in FIG. 6B, three different training scenarios may be simultaneously run across the screens 116 increasing the training capacity of the system 100 to three different groups at once. As shown in FIG. 6C, similar to FIG. 6B, the rotatable frames 112-114 can be rotated back to provide three screens that can be implemented independently. As shown, the rotatable frames 112-114 may rotate approximately 90 degrees back from parallel with the static frame 110 to be substantially perpendicular to the static frame 110. As can be appreciated, the configurations shown in FIG. 6B and FIG. 6C provide similar benefits, but each provides a different footprint that may be more applicable given a location of where the system 100 is placed.

Figure 6D:
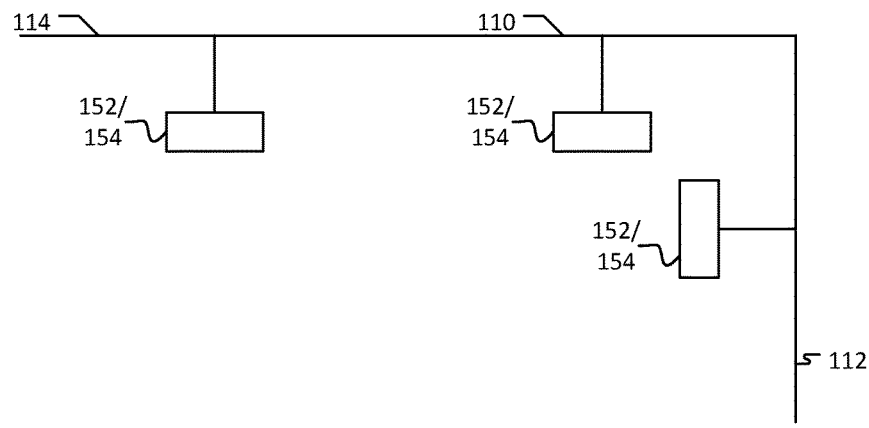
Figure 6E:
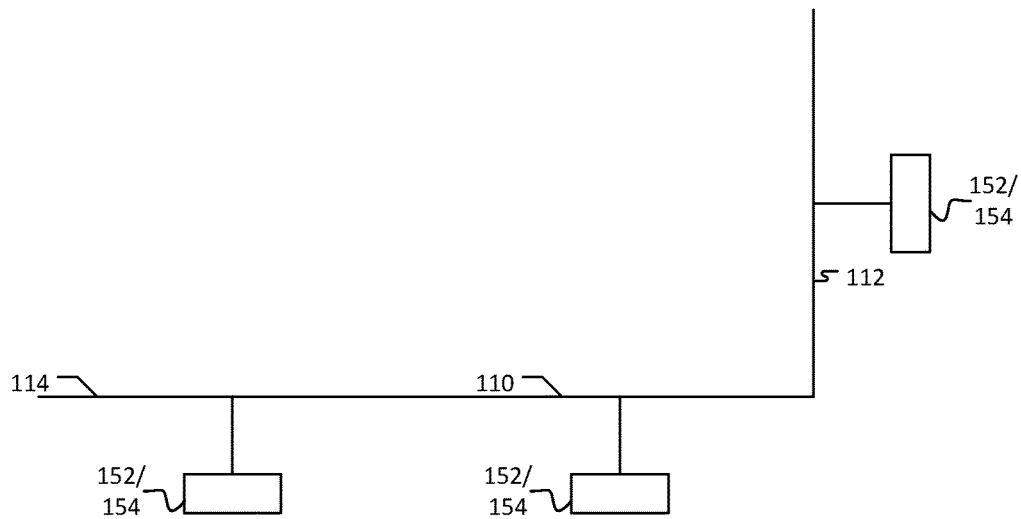

As shown in FIGS. 6D-6E, two different configurations implementing combining one of the rotatable frames 112-114 with the static frame 110 to form a larger screen is shown. As can be appreciated, the configuration shown in FIG. 6E can allow the simulator system 104 to display a first scenario on the large screen and a second scenario, or target training, on the smaller screen. In such a configuration, the simulator system 104 can actively run two scenarios or training exercises simultaneously, thus increasing an efficiency of the multi-configuration simulator screen system 100.

Referring to FIG. 7, a block diagram of how the frames 110-114 of the multi-configuration screen assembly 102 can be configured is illustrated. As shown, the rotatable frames 112-114 on either side of the static frame 110 can be adapted to rotate approximately 360 degrees around the hinged connections 122 between the rotatable frames 112-114 and the static frame 110. In one embodiment, the rotatable frames 112-114 can be adapted to rotate up to approximately 90 degrees, from parallel with the static frame 110, towards a front of the static frame 110 and up to approximately 135 degrees, from parallel with the static frame 110, towards a back of the static frame 110. Of note, a length of the booms 118 may determine how far each of the rotatable frames 112, 114 may rotate relative to the static frame 110.

In a typical implementation of the multi-configuration simulator screen system 100, the multi-configuration screen assembly 102 can be configured into a first configuration. For instance, each of the frames 110, 112, 114 can be aligned substantially parallel forming one big screen. The simulator system 104 may then run a first training scenario to be displayed on the screen assembly 102 via the projectors 152. In one instance, the first training scenario may be a simulated shooting range where a plurality of users may interact with the multi-configuration simulator screen system 100. For example, a police station may set up the system 100 for training purposes. As can be appreciated, officers may practice shooting with the simulated weapons 156 on the simulated shooting range without having to fire live ammunition.

With the multi-configuration simulator screen system 100, the police station may offer a variety of different training situations by reconfiguring the screen assembly 102. For instance, after target practice, the multi-configuration screen assembly 102 may be configured into a second configuration. In the second configuration, the rotatable frames 112, 114 may be rotated forward approximately 45 degrees. In the second configuration, the simulator system 104 can run a second training scenario. In one example, the second training scenario may be a live action scenario where the officers must interact with one or more perpetrators displayed on the screen assembly 102. In some instances, the training scenario may branch from one video segment to another video segment based on actions of a user. For example, the training scenario may show a perpetrator with whom the user should fire their simulated weapon at, if the cameras 154 detect pulses of light within the defined perpetrator, the training scenario may branch to a video segment of the perpetrator being shot and a hostage being let go. As can be appreciated, the multi-configuration screen assembly 102 can be configured into one of a plurality of different configurations based on a training scenario to be run.

An Embodiment of an Automated Multi-Configuration Screen Assembly

Figure 8:
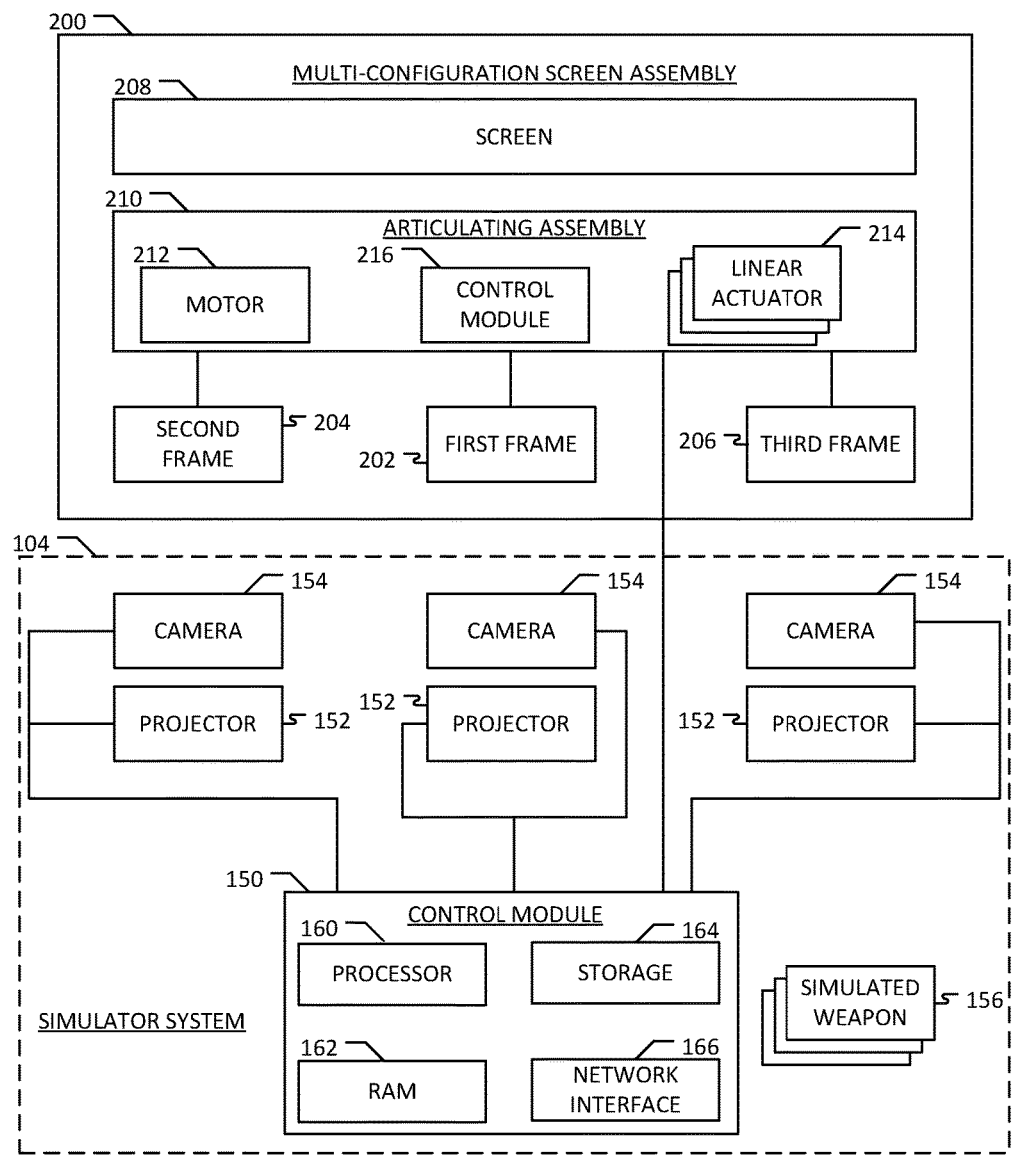
FIG. 8 is a block diagram of an automated multi-configuration simulator screen system according to one embodiment of the present invention.

Referring to FIG. 8, a detailed diagram of an embodiment 200 of an automated multi-configuration screen assembly is shown. The automated multi-configuration screen assembly 200 can be implemented with the previously described simulator system 104 to provide a dynamically moving screen assembly that can move in sync with a simulated scenario. The automated multi-configuration screen assembly 200 can be constructed substantially similar to the first embodiment screen assembly 102 with the addition of an articulating assembly for changing a configuration of the screen assembly 200.

Typically, the automated multi-configuration screen assembly 200 can include, but is not limited to, a first frame 202, a second frame 204, a third frame 206, at least one screen 208, and an articulating assembly 210. As mentioned previously, though not shown, the automated multi-configuration assembly 200 can be constructed substantially similar to the first embodiment screen assembly 102 including booms, support structures, casters, etc. The frames 202, 204, 206 and the screen 208 can be constructed substantially similar to the first embodiment frames 110, 112, 114 and the screen 116. The articulating assembly 210 can be connected to each of the frames 110, 112, 114 such that the articulating assembly 210 can move the second frame 204 and the third frame 206 relative to the first frame 202. In some embodiments, the articulating assembly 210 can be configured to also move the entire multi-configuration screen assembly 200 as one unit.

In one embodiment, the articulating assembly 210 can include, but is not limited to, at least one motor 212, a plurality of linear actuators 214, and a control module 216. The control module 216 can be implemented to actuate one or more of the plurality of linear actuators 214. In one instance, the control module 216 may receive a signal from the simulator system 104 to activate the motor 212 to actuate one of the plurality of linear actuators 214 to move the second frame 204 and/or the third frame 206. The at least one motor 212 can be implemented to actuate the plurality of linear actuators 214. As can be appreciated, more than one motor 212 can be implemented. For instance, a motor may be paired with each linear actuator.

Typically, one of the plurality of linear actuators 214 can be coupled proximate a base support of the second frame 204 and one can be coupled proximate a base support of the third frame 206. As can be appreciated, as the linear actuators are actuated, a distal end of the second frame 204 and/or the third frame 206 can be pushed (or pulled) by the linear actuator 214, thus changing a configuration of the automated multi-configuration screen assembly 200. Of note, the first frame 202 may be locked in place such that the first frame 202 does not move when the linear actuators 214 are actuated. Typically, the base supports of the second frame 204 and the third frame 206 can include casters (or wheels) to facilitate the movement of said frames. In some embodiments, the articulating assembly 200 may include a motor coupled to a plurality of wheels connected to each of the frames 202, 204, 206 for moving the entire automated multi-configuration screen assembly 200.

In another embodiment, the articulating assembly 210 may include a pair of electric motors each having a shaft that is configured to rotate the second frame 204 and the third frame 206. The shafts of the electric motors may be operatively coupled to the second frame 204 and the third frame 206 and can be activated independently or simultaneously. The control module 150 of the simulator system 104 may be configured to turn the motors on and off. Typically, the electric motors can include a switch (that may be toggled remotely) to control a directional rotation of the shafts of the electric motors. In one instance, the articulating assembly 210 may include the previously described control module 216 adapted to receive signals from the simulator system 104 or another device. The electric motors may be coupled to either side of the first frame 202 and the shafts of the electric motors may be operatively coupled to the second frame 204 and the third frame 206, respectively. As can be appreciated, when the shaft rotates, the second frame 204 and the third frame 206 can be rotated with the shafts of the electric motors.

In one embodiment, the articulating assembly 210 can be connected to the simulator system 104 and can be configured to receive signals from the control module 150. When the articulating assembly 210 is connected to the simulator system 104, the simulator system 104 may send signals to change a configuration of the multi-configuration screen assembly 200. In some instances, the simulator system 104 may send the signals in conjunction with a training scenario being run and displayed on the multi-configuration screen assembly 200. For instance, the frames 202, 204, 206 can be moved from one configuration to another configuration as the training scenario is being conducted. For example, the training scenario may include portions of the scenario wherein a layout presented in the scenario may change from a room to an open space. In such an example, the multi-configuration screen assembly 200 may be configured in a substantially trapezoidal shape and when the scenario changes to an open space (e.g. an open field or a street), then the simulator system 104 may send a signal to the articulating assembly 210 to move the second frame 204 and the third frame 206 in-line with the first frame 202. Of significant note, with the projectors 152 attached to the frames 202, 204, 206 via booms, the projectors 152 can continuously be in-focus as a training scenario is run and the multi-configuration screen assembly 200 changes configurations.

In one example, the multi-configuration screen assembly 200 may form a substantially "U" shaped configuration to simulate a building having multiple rooms. As the training scenario progresses and moves to an outdoor location, the articulating assembly 210 can change a configuration of the multi-configuration screen assembly 200 to provide a large unitary screen portraying an air field. As can be appreciated, the possibilities are almost endless for providing a simulator system that has a multi-configuration screen assembly where the projectors for each screen are constantly in-focus no matter an orientation of each screen.

In another embodiment, the articulating assembly 210 can include a control module connected to a control device to allow a user to manually control the articulating assembly 210. For instance, a smart device may be wirelessly connected to the articulating assembly 210 for controlling the articulating assembly 210 and configuration of the frames 202, 204, 206.

Of note, when the frames 202, 204, 206 are coupled to the articulating assembly 210 for automatically changing a configuration of the screen assembly 200, the projectors 152 can be moved in unison with the screen assembly 200 allowing the projectors 152 to remain in-focus even while the screen assembly 200 is changing configuration. As such, no matter what the configuration of the screen assembly 200 ends up being, the projectors 152 may always be in a position to be in-focus with the screen assembly 200.

Modular Virtual Shoot House System

Figure 9:
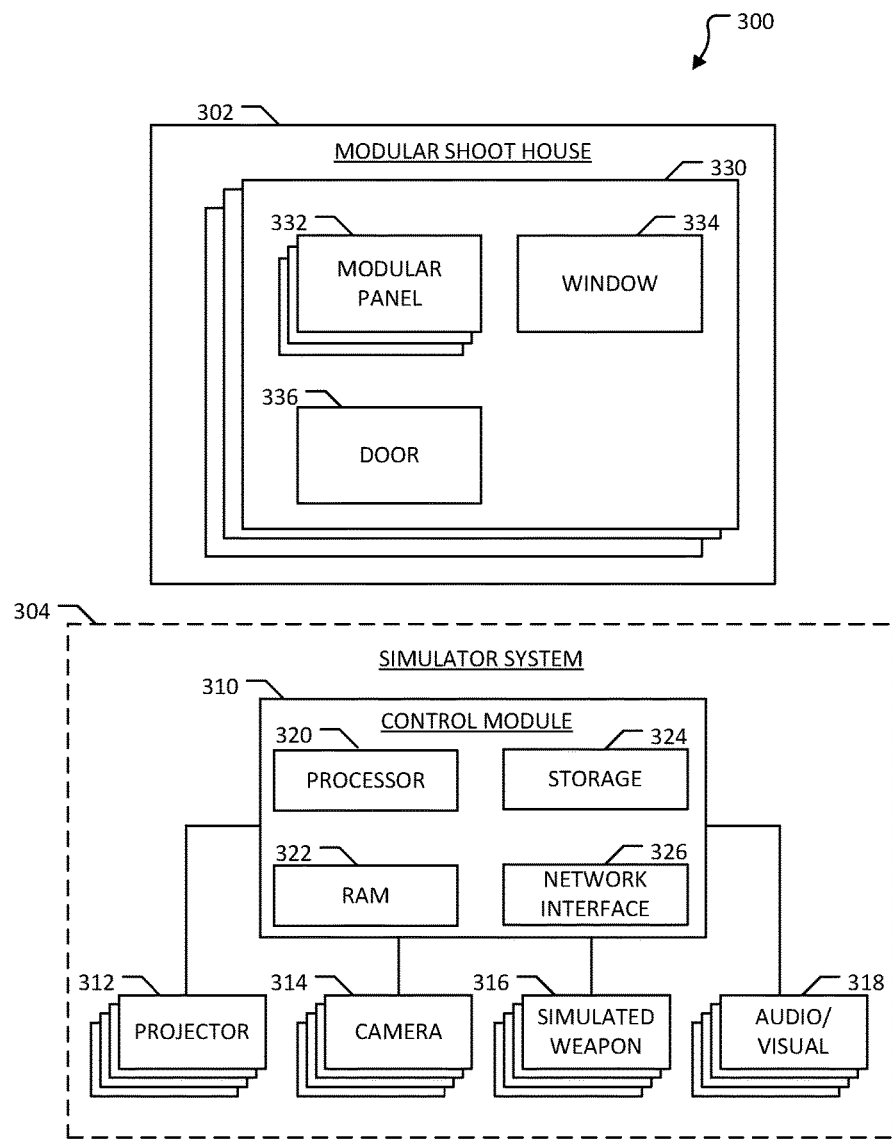
FIG. 9 is a block diagram of a modular virtual shoot house system according to one embodiment of the present invention.

Referring to FIG. 9, a block diagram of an embodiment 300 of a modular virtual shoot house system is illustrated. The modular virtual shoot house system 300 can be implemented to integrate virtual training inside a shoot house. By including modular building materials, an endless configuration of different room setups can be implemented with virtual training.

The modular virtual shoot house system 300 can include, but is not limited to, a modular shoot house 302 and a simulator system 304. Typically, components of the simulator system 304 can be integrated with the modular shoot house 302.

The simulator system 304 can include, but is not limited to, a control module 310, a plurality of projectors 312, a plurality of cameras 314, and one or more simulated weapons 316. In some embodiments, the simulator system 304 can further include one or more devices 318 for generating sounds and visual displays in addition to the projectors 312.

The modular shoot house 302 can include, but is not limited to, one or more rooms 330 each defined by a plurality of modular panels 332. Typically, the one or more rooms 330 can have an entrance and an exit. In some embodiments, the one or more rooms 330 can each include, but are not limited to, the modular panels 332, one or more windows 334, and one or more doors 336.

Typically, a projector 312 and a camera 314 can be paired together and coupled to a bracket for securing to one of the panels 332 of one of the rooms 330 of the modular shoot house 302. In a typical implementation, each of the rooms 330 of the shoot house 302 can include one or more projector/camera pairings to display on a wall of the room where the projector may be pointed. For example, a first room may have three projector/cameras displaying on three walls of the first room and a second room may have one projector/camera displaying on one wall of the second room.

In one embodiment, a wall of each room 330 can be comprised of the plurality of panels 332 that can be connected together to form one or more walls and rooms. Typically, each of the panels 332 can have a white color. In one example, the shoot house 302 can be constructed similar to a shoot house manufactured by Mobile Police Training Structures, Inc. (MPTS). The modular shoot house 302 can be configured in a multitude of layouts and the projectors 312 and the cameras 314 can be moved based on a design of the shoot house. For instance, the shoot house may have a first layout with the projectors and cameras positioned in a first configuration. In another instance, the shoot house may be transformed into a second layout, and the projectors and cameras can be reconfigured into a second configuration to match the second layout.

Typically, each pair of the projector 312 and the camera 314 can be mounted to a bracket that can be removably coupled to an upper portion of one of the panels 332 of the modular shoot house 302. As can be appreciated, the projectors 312 and the cameras 314 can be moved around the shoot house and positioned to project onto a wall as desired by a user or dictated by a training scenario. In one embodiment, the projector 312 and the camera 314 can be mounted to a plate that is connected to a boom extending out from a top of one of the panels 332 of the shoot house, similar to a construction previously described. As can be appreciated, the panel 332 can be moved with the projector/camera and the projector can remain in-focus even when moved.

Figure 10:
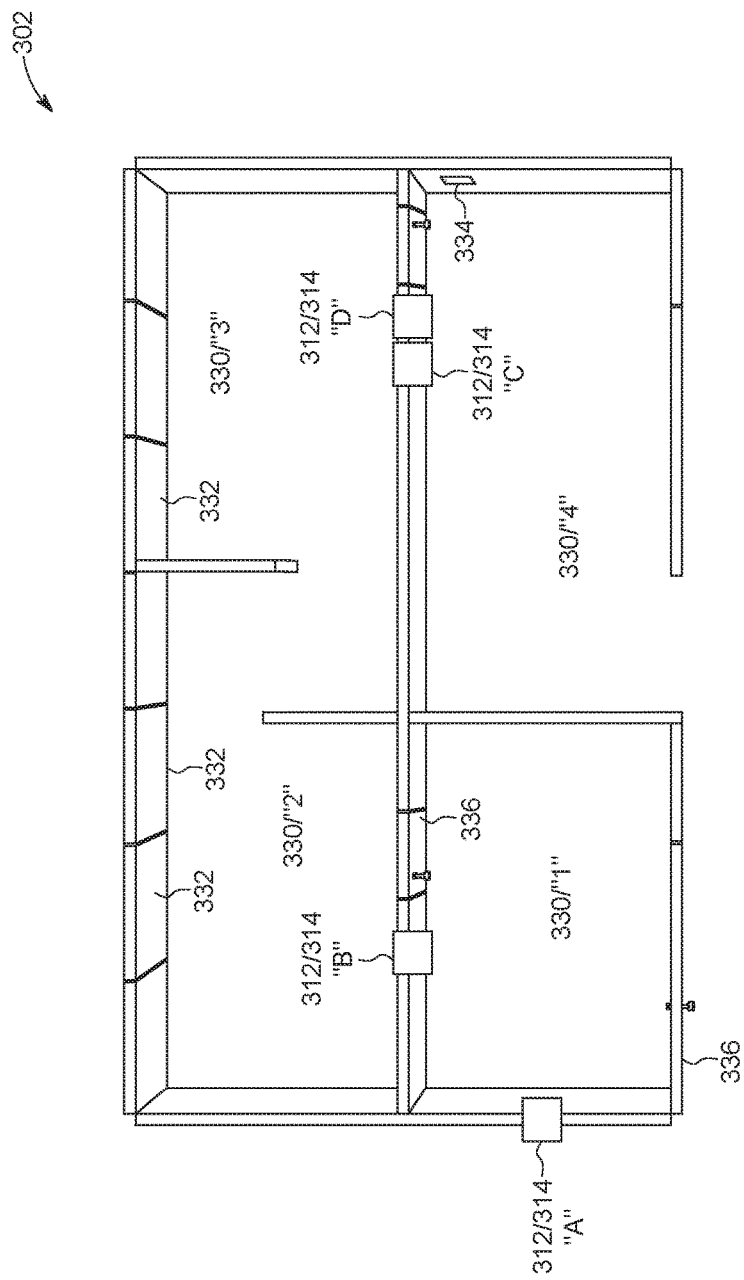
FIG. 10 is a top view of a modular virtual shoot house according to one embodiment of the present invention.

Referring to FIG. 10, a top view of one example of the modular shoot house 302 is illustrated. As shown, the shoot house 302 can include a plurality of rooms 330 connected via doors and hallways. Of note, the shoot house 302 can be manufactured or can be substantially similar to shoot houses constructed by Mobile Police Training Structures, Inc. As shown, the shoot house 302 can include the plurality of projectors 312 and the cameras 314 to virtualize a wall in the rooms 330. As can be appreciated, a wall located across from where the projector 312 is mounted can be virtualized.

Figure 11:
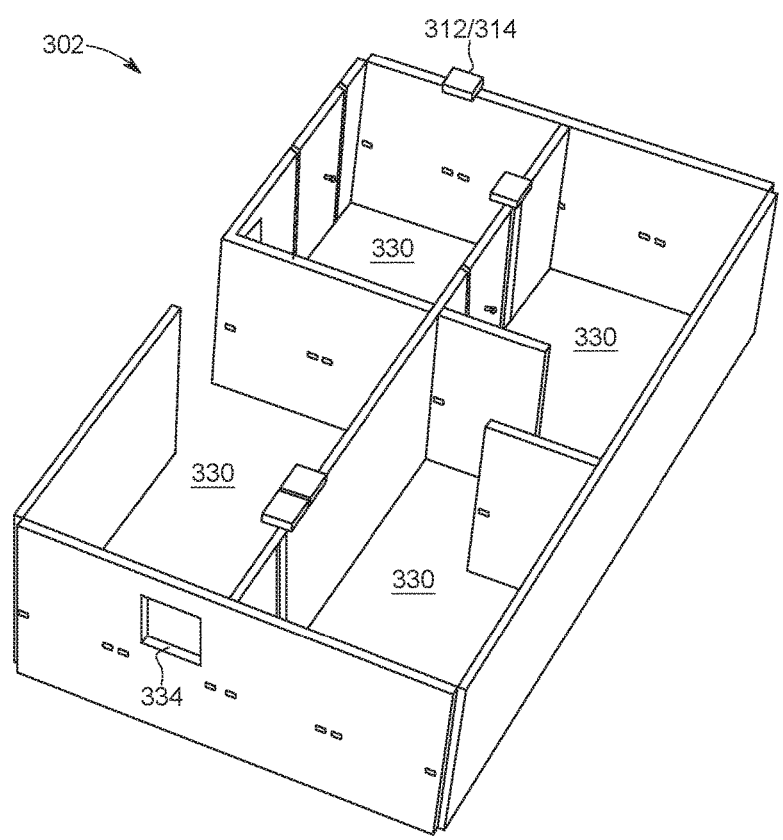
FIG. 11 is a back perspective view of a modular virtual shoot house according to one embodiment of the present invention.

Referring to FIG. 11, a top back perspective view of the example virtual shoot house 302 is illustrated. As shown, the projectors 312 and the cameras 314 can be mounted atop the walls of the shoot house 302. In one embodiment, the projectors 312 and the cameras 314 can be connected to a "U" shaped coupling (or mounting bracket) for securing the projectors 312 and the cameras 314 proximate a top of a wall. In one embodiment, the projectors 312 and the cameras 314 can be removably coupled to the walls to allow the projectors 312 and the cameras 314 to be moved to alter a layout of the shoot house 302. As can be appreciated, by allowing the projectors 312 and the cameras 314 to be moved, the simulator system 304 can run scenarios based on the locations of the projectors 312 and the cameras 314.

For illustrative purposes only, an example implementation of the modular virtual shoot house system will be described hereinafter. As can be appreciated, the example may provide some basic understanding of how the modular virtual shoot house system may be used, but is not meant to be limiting.

Referring back to FIG. 10, four rooms are shown in the virtual shoot house. A line is illustrated showing a path that may be taken by a user as they move through the shoot house 302. The rooms are marked 1-4 and the projector/cameras are marked as A-D. For this example, projector A can be oriented to show a scenario in room 1, projector B can be oriented to show a scenario in room 2, projector C can be oriented to show a scenario in room 3, and projector D can be oriented to show a scenario in room 4.

In one embodiment, the simulator system 304 can be configured to determine which room a user chooses to enter first. For instance, the shoot house 302 may include motion sensors proximate a door to room 1 and motion sensors proximate the opening to room 4. It to be appreciated that other activity sensing sensors may be implemented to determine which room a user begins in. Typically, the simulator system 304 can begin a first training scenario based on the user entering the first door or a second training scenario based on the user entering the opening to room 4.

In some embodiments, the simulator system 304 can include the plurality of multi-media devices 318 to project audio and/or visual displays from somewhere in the shoot house 302 to help dictate where the user will enter or proceed to. For instance, a speaker may be placed in room 1 which generates the sound of a women screaming to dictate to the user that they should enter room 1 first. If the user elects to enter room 4, a different training scenario may be initiated that is different from a training scenario if the user selected room 1. As can be appreciated, the simulator system 304 may include audio devices in each room to aid movement through the shoot house 302. For instance, a user entering room 1 may then hear screaming coming from room 4. As can be appreciated, the simulator system 304 may determine via a sensor that the user entered room 1 and then automatically play a sound in a different room as part of the training scenario.

Of note, the simulator system 304 may use dynamic sequencing of a training scenario based on actions of a user. Described hereinafter is one example of a user moving through the shoot house shown in FIG. 10. A user can start a training scenario by beginning outside room 1 of the shoot house 302. As the user enters room 1, projector A can be activated to start when the door to room 1 is opened. For instance, a magnetic sensor on the door may be tripped which indicates to the simulator system 304 that the user is entering room 1. The simulator system 304 may then activate a training scenario to display through projector A. Alternatively, the training scenario can be started by an instructor as the instructor views the user entering room 1. The user can then interact with the scenario being shown on the wall located opposite the wall that projector A is located on. For instance, the user may fire the simulated weapon 316 which the camera 314 can be implemented to detect. As mentioned previously, the simulator system 304 may activate an audio device located in another room based on the user entering room 1. The simulator system 304 can then determine which scenario to play on projector B based on interactions the user had with the scenario shown on projector A. For example, a perpetrator may have shown himself in room 1 and if the user did not nullify the threat from the perpetrator and the perpetrator escaped, the simulator system can bring the perpetrator back to be displayed by projector B, C, or D since the user did not nullify the threat. Once the user enters room 2, projector B can be activated to begin a scenario for the user to interact with and so on as the user moves from room to room and interacts with scenarios being presented by the projectors A-D. Of significant note, the simulator system 304 can be configured to present a training scenario based on a previously interacted with scenario, as a user moves from room to room. As can be appreciated, the user can have an entirely different interaction moving through the shoot house 302 based on how the user interacts with each scenario.

Of note, the simulator system 304 can be configured to present training scenarios whether the user starts in room 1 and moves through to room 4, or begins in room 4 and moves through to room 1. As can be appreciated, the simulator system 304 can play one of several different scenarios based on decisions made by the user. Generally, these decisions can be detected by sensors and the cameras 314 which can be translated by the simulator system 304 to then determine which scenario or action to take next.

In some instances, the training scenario may have the user progress through the rooms and then be directed back into a previously entered room, with the previously entered room having a different virtual configuration by what is displayed via the simulator system 304. As can be appreciated, by being able to dynamically and virtually reconfigure rooms, the shoot house 302 can present scenarios involving more than the 3-4 physical rooms of the shoot house 302.

Of note, the modular shoot house 304 described can be manufactured from a plurality of different materials. In one embodiment, a plurality of the multi-configuration screen assemblies 102 can be configured to form a shoot house. As can be appreciated, each room of the shoot house would be virtualized, creating a completely virtualized shoot house.

Alternative Embodiments and Variations

Of note, each of the previously describes systems and assemblies can be implemented in interactive entertainment systems. For instance, the modular virtual shoot house system can be implemented as an interactive zombie game whereby users may enter the house and encounter zombies. The users may be outfitted with the simulated weapons for interacting with the zombies that appear on walls of the house by the projectors. In another example, the modular virtual shoot house system may be implemented as an endless room haunted house whereby users could move through the shoot house and then be sent back through the shoot house. As the user(s) move through the shoot house, the simulator system can project different scenarios each time the user(s) enters a particular room.

In one example, the multi-configuration simulator screen system could be set up in an arcade style gaming system. The screens could be configured based on a selection by a user and the user or users could then interact with a gaming scenario being displayed by the multi-configuration screen assembly. For example, where the screens are laid out in-in line with one another, a large scale shooting range could be presented to one or more users. In another example, the frames could be set up to individual screens such that multiple users could be playing a game independently or co-operatively with other users. As can be appreciated, first-person-shooter games could be run by the simulator system and displayed on the multi-configuration screen assembly for users to interact with.

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A method of implementing a multi-configuration simulator screen system, the method comprising:
   providing a multi-configuration simulator screen system, the system comprising:
      a multi-configuration screen assembly including:
         a first frame, the first frame including a first boom having a proximal end and a distal end, the proximal end being coupled to the first frame and the distal end adapted to include a first projector;
         a second frame rotatably coupled to the first frame, the second frame including a second boom having a proximal end and a distal end, the proximal end being coupled to the second frame and the distal end adapted to include a second projector;
         a third frame rotatably coupled to the first frame, the third frame including a third boom having a proximal end and a distal end, the proximal end being coupled to the third frame and the distal end adapted to include to a third projector; and
         at least one screen coupled to the first frame, the second frame, and the third frame;
      a simulator system including a computing device operatively connected to the first projector, the second projector, and the third projector, the computing device configured to run one or more scenarios on the at least one screen via the first projector, the second projector, and the third projector;
   configuring the multi-configuration screen assembly into a first configuration; and
   displaying a first training scenario on the multi-configuration screen assembly in the first configuration.

2. The method of claim 1, the method further comprising the steps of:
   configuring the multi-configuration screen assembly into a second configuration; and
   displaying one or more training scenarios on the multi-configuration screen assembly in the second configuration.

3. The method of claim 1, the method further comprising the steps of:
   configuring the multi-configuration screen assembly into (i) a first screen defined by a first portion of the at least one screen and the first frame, (ii) a second screen defined by a second portion of the at least one screen and the second frame, and (iii) a third screen defined by a third portion of the at least one screen and the third frame; and
   displaying a different training scenario on each of the first screen, the second screen, and the third screen.

4. The method of claim 3, wherein the second configuration is defined by the second frame and the third frame each being rotated approximately 20 to 135 degrees back from parallel with the first frame towards a back of the first frame.

5. The method of claim 1, wherein (i) the second frame further includes a first set of casters located proximate a distal end of the second frame; and (ii) the third frame includes a second set of casters located proximate a distal end of the third frame.

6. The method of claim 1, wherein the second frame is rotatably coupled to a first side of the first frame and the third frame is rotatably coupled to a second side of the first frame.

7. The method of claim 1, wherein the simulator system further includes at least one weapon adapted to generate a pulse of light.

8. The method of claim 7, wherein (i) the simulator system further includes a first camera coupled to the first boom approximate the first projector, a second camera coupled to the second boom approximate the second projector, and a third camera coupled to the third boom approximate the third projector; and (ii) the first camera, the second camera, and the third camera are each adapted to detect pulses of light.

9. The method of claim 8, wherein the first camera, the second camera, and the third camera remain calibrated when the multi-configuration screen assembly is configured.

10. A multi-configuration simulator screen system comprising:
   a multi-configuration screen assembly, the multi-configuration screen assembly including:
      a first frame, the first frame including:
         a first boom having a proximal end and a distal end, the proximal end being coupled to the first frame and the distal end coupled to a first projector; and
         a first screen;
      a second frame rotatably coupled to the first frame, the second frame including:
         a second boom having a proximal end and a distal end, the proximal end being coupled to the second frame and the distal end coupled to a second projector; and
         a second screen;
      a third frame rotatably coupled to the first frame, the third frame including:
         a third boom having a proximal end and a distal end, the proximal end being coupled to the third frame and the distal end coupled to a third projector; and
         a third screen;
   a simulator system including a computing device operatively connected to the first projector and the second projector, the computing device configured to run one or more scenarios on the first screen, the second screen, and the third screen via the first projector, the second projector, and the third projector.

11. The system of claim 10, wherein the first projector is adapted to project a video image on the first screen, the second projector is adapted to project a video image on the second screen, and the third projector is adapted to project a video image on the third screen.

12. The system of claim 10, wherein the second frame is adapted to rotate (i) approximately 45 degrees in from parallel with the first frame towards a front of the first frame; and (ii) approximately 135 degrees back from parallel with the first frame towards a back of the first frame.

13. The system of claim 10, wherein the simulator system further includes at least one weapon adapted to generate a pulse of light.

14. The system of claim 13, wherein (i) the simulator system further includes a first camera coupled to the first boom approximate the first projector and a second camera coupled to the second boom approximate the second projector; and (ii) the first camera and the second camera are adapted to detect pulses of light.

15. The system of claim 10, wherein the simulator system is adapted to run (i) a first training scenario being displayed on the first screen, the second screen, and the third screen; (ii) the first training scenario being displayed on the first screen, a second training scenario being displayed on the second screen, and a third training scenario being displayed on the third screen; and (iii) the first training scenario being displayed on the first screen and the second screen and the second training scenario being displayed on the third screen.

16. A multi-configuration simulator screen system comprising:
   a multi-configuration screen assembly, the multi-configuration screen assembly including:
      a first frame having a substantially rectangular shape, the first frame including a first boom;
      a second frame rotatably coupled to the first frame approximate a left side of the first frame, the second frame including a second boom;
      a third frame rotatably coupled to the first frame approximate a right side of the first frame, the third frame including a third boom;
      an articulating assembly operatively coupled to the second frame and the third frame; and
      at least one screen coupled to the first frame, the second frame, and the third frame;
   a simulator system, the simulator system including:
      a computing device configured to run one or more scenarios being displayed on the multi-configuration screen assembly;
      a first projector mounted to a distal end of the first boom and being operatively connected to the computing device;
      a second projector mounted to a distal end of the second boom and being operatively connected to the computing device; and
      a third projector mounted to a distal end of the third boom and being operatively connected to the computing device;
   wherein the articulating assembly is adapted to move the second frame and the third frame.

17. The multi-configuration simulator screen system of claim 16, wherein the articulating assembly moves the first frame or the second frame based on receiving a signal from the simulator system.

18. The multi-configuration simulator screen system of claim 17, wherein the simulator system generates the signal based on a training scenario being run by the simulator system.

19. The multi-configuration simulator screen system of claim 18, wherein a configuration of the multi-configuration screen assembly is changed at least once while the training scenario is being run by the simulator system.

20. The multi-configuration simulator screen system of claim 16, wherein a configuration of the multi-configuration screen assembly is based on a training scenario being run by the simulator system.

* * * * *